US012729934B2

(12) United States Patent
Nichols et al.

(10) Patent No.: US 12,729,934 B2
(45) Date of Patent: Sep. 8, 2026

(54) TARGET SIGHT SYSTEM INCLUDING REFLEX SIGHT HAVING EMITTER ARRAY

(71) Applicant: Sig Sauer, Inc., Newington, NH (US)

(72) Inventors: John P. Nichols, Tigard, OR (US); Jason Clark, Beaverton, OR (US)

(73) Assignee: SIG SAUER, INC., Newington, NH (US)

( * ) Notice: Subject to any disclaimer, the term of this patent is extended or adjusted under 35 U.S.C. 154(b) by 0 days.

(21) Appl. No.: 19/075,589

(22) Filed: Mar. 10, 2025

(65) Prior Publication Data

US 2025/0369724 A1 Dec. 4, 2025

Related U.S. Application Data

(63) Continuation of application No. 17/955,406, filed on Sep. 28, 2022, now Pat. No. 12,247,808.

(60) Provisional application No. 63/249,426, filed on Sep. 28, 2021.

(51) Int. Cl.
*F41G 1/34* (2006.01)
*F41G 1/30* (2006.01)
*G02B 23/10* (2006.01)

(52) U.S. Cl.
CPC ............... *F41G 1/345* (2013.01); *F41G 1/30* (2013.01); *G02B 23/105* (2013.01)

(58) Field of Classification Search
CPC .......... F41G 1/345; F41G 1/30; G02B 23/105
USPC ............................................................ 42/132
See application file for complete search history.

(56) References Cited

U.S. PATENT DOCUMENTS 6,327,806 B1 12/2001 Paige
7,654,029 B2 2/2010 Peters et al.
9,593,907 B2 * 3/2017 Regan ...................... F41G 1/30
10,240,898 B2 3/2019 Crispin
2003/0101604 A1 * 6/2003 McGivern .............. F41G 1/467 33/265
2005/0252062 A1 11/2005 Scrogin et al.
2006/0162226 A1 7/2006 Tai
2009/0059219 A1 * 3/2009 Mok ................... G02B 27/026 356/251
2009/0188976 A1 7/2009 Gunnarsson et al.
2012/0159833 A1 6/2012 Hakanson et al.
2014/0075820 A1 * 3/2014 Ben-Ami ................. F41G 1/30 42/131

FOREIGN PATENT DOCUMENTS

WO 2012137195 A1 10/2012

* cited by examiner

*Primary Examiner* — Samir Abdosh
(74) *Attorney, Agent, or Firm* — Miller Nash LLP

(57) ABSTRACT

A reflex sight for a firearm includes an emitter array including a plurality of light emitters, each of the plurality of light emitters capable of being independently operated to produce light, a surface structured to reflect light from the emitter array to a user of the firearm, and a controller configured to receive input from the user and individually control the operation of the plurality of light emitters in the emitter array.

21 Claims, 7 Drawing Sheets

TARGET SIGHT SYSTEM INCLUDING REFLEX SIGHT HAVING EMITTER ARRAY

CROSS-REFERENCE TO RELATED APPLICATIONS

This application is a continuation of U.S. Non-provisional patent application Ser. No. 17/955,406, titled "REFLEX SIGHT HAVING EMITTER ARRAY," filed Sep. 28, 2022, which claims benefit of U.S. Provisional Application No. 63/249,426, titled "REFLEX SIGHT HAVING EMITTER ARRAY," filed Sep. 28, 2021, the disclosures of both of which are incorporated herein by reference in their entirety.

TECHNICAL FIELD

This disclosure relates to sights for firearms, and, more particularly, to reflex sights for firearms.

BACKGROUND

Reflex type gun sights, also commonly referred to as red-dot sights, provide a shooter a quick and easy way to sight a target compared to conventional iron sights. Reflex sights are optical sights that include a partially reflecting element on which an aiming light or target is projected. An LED or other light emitter is commonly used as the light source. When the emitter generates its light signal, the projected light reflects from the reflecting element, such as a lens or other optic, and the reflection is seen by the shooter as being superimposed on the target or field of view. This reflection is referred to as a Point of Aim (PoA). In operation, the shooter then aligns the target to the PoA to accurately aim the gun at the target.

Modern reflex sights typically include a positioning apparatus to change an origin position of the emitted light. Changing the physical location of the emitted light relative to the lens allows the shooter to compensate for targets at various distances or for a misalignment between the sight and the barrel. Without this compensation, the shooter may have to aim the firearm at a non-indexed location that is different than the actual PoA to account for these effects.

A typical positioning apparatus on a reflex sight includes a positioning or carrier plate to which the light emitter is physically mounted. Then, the shooter may adjust the longitudinal and/or latitudinal position of the plate relative to the reflective lens of the optic, typically by turning threaded adjusters that are mechanically coupled to the plate. Moving the position of the carrier plate, in turn, moves the reflected position of the light emitted from the emitter back to the shooter, allowing the reflex sight to cause the targeting dot to be positioned in the new position. Physical positioning apparatuses on modern reflex sights are complex, require tight manufacturing tolerances, and are subject to wear and breakage. Further, it is possible that extreme shocks, such as those caused by dropping the firearm, can cause the carrier plate to move, dislodge, or otherwise lose accuracy. In addition, typical carrier plate systems can have undesirable phenomena while adjusting, such as non-linear travel, dead positioning clicks, and inconsistency in resolution per revolution.

Embodiments according to this disclosure address these and other shortcomings of conventional sights.

DETAILED DESCRIPTION

Embodiments of the invention are directed to a reflex sight including an array of light emitters, such as LEDs, placed on a fixed board on which the emitters are mounted. Individual or multiple of the individual light emitters of the array may be energized to cause an aiming dot, or even several dots, to appear at controllable locations within a shooter's field of view.

Figure 1:
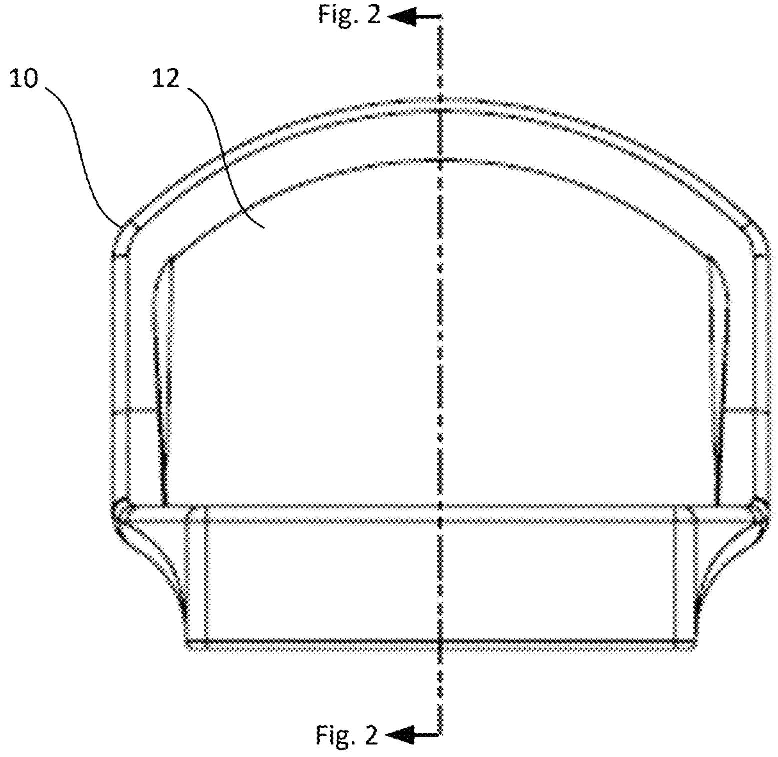
FIG. 1 is a front view of a reflex sight including an emitter array according to embodiments of the disclosure.

FIG. 1 is a front view of a reflex sight 10 including an emitter array according to embodiments of the invention. A reflecting plate or lens 12 is mounted within the reflex sight 10. As described above, light emitted from one or more emitters from the emitter array reflects from the lens 12 back toward the shooter, so that an aiming dot or dots are visible within the shooter's field of view as a Point of Aim (PoA).

Figure 2:
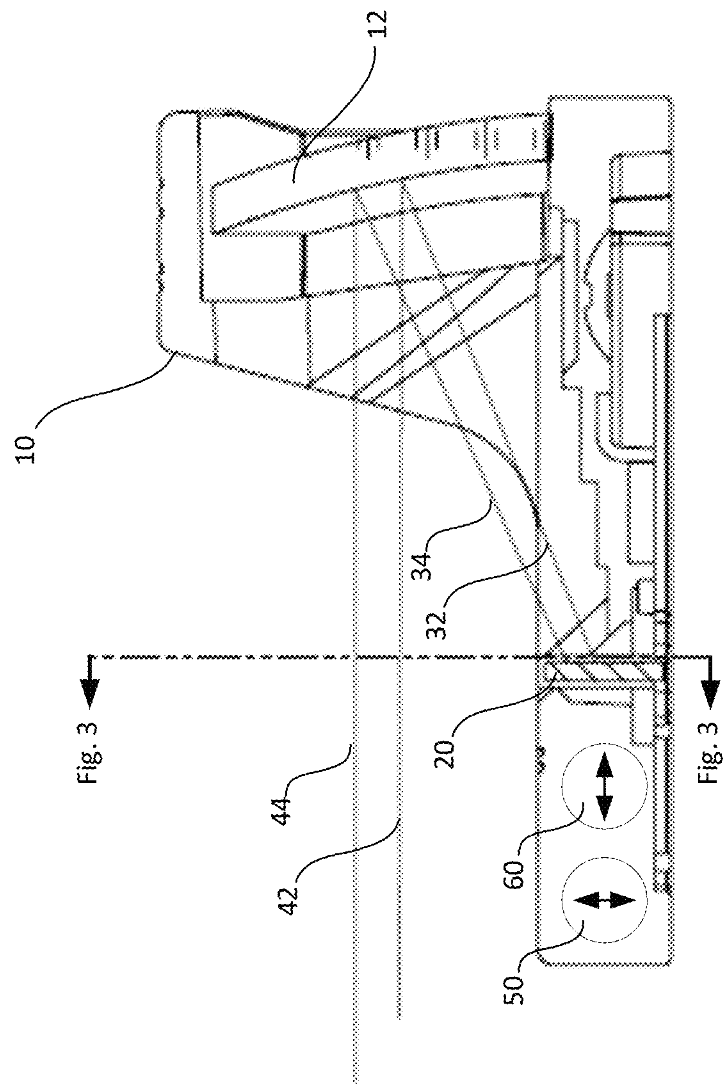
FIG. 2 is a side view of the reflex sight, along the line indicated in FIG. 1, according to embodiments of the disclosure.
Figure 3:
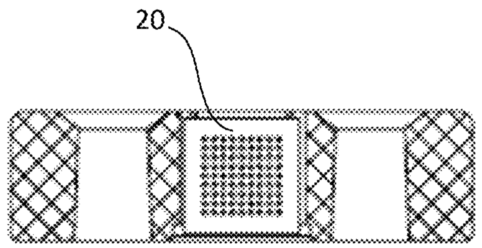
FIG. 3 is a front view of an emitter array of the reflex sight of FIG. 1, along the line indicated in FIG. 2, according to embodiments of the disclosure.
Figure 4:
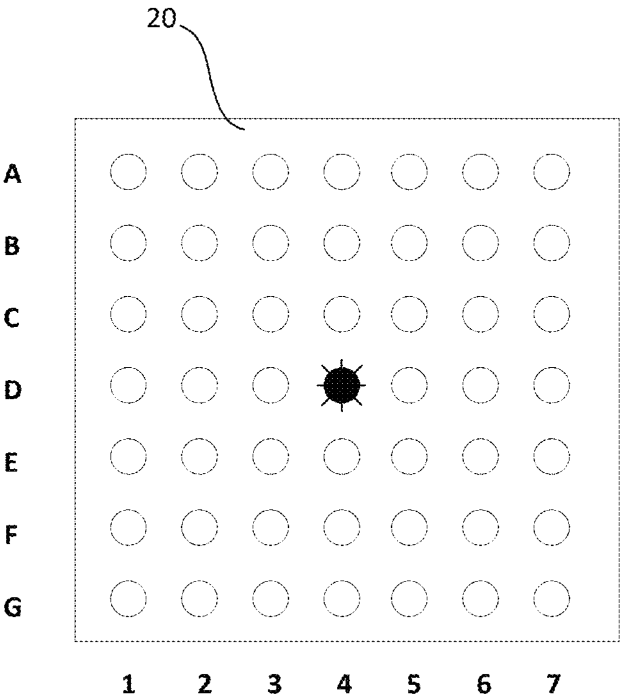
FIG. 4 illustrates a center dot PoA created by energizing a center emitter of the emitter array of FIG. 3, according to embodiments of the disclosure.

FIG. 2 is a side view of the reflex sight 10, taken along the line indicated in FIG. 1. The reflex sight 10 includes an emitter array 20. An example emitter array 20 is illustrated in FIG. 3, and includes multiple individually controllable light emitters mounted to a substrate. The individual light emitters may be arranged in a square or rectangular pattern, such as illustrated in FIGS. 3 and 4. In other embodiments the light emitters may be pre-arranged in other patterns, or in non-evenly spaced arrangements. In the embodiment illustrated in FIG. 4, an array 20 of forty-nine individually addressable and controllable emitters of the emitter array 20 are located along a Cartesian plane. In this example, emitters may be individually addressed through an index of rows A-G and columns 1-7. For example, in FIG. 4, the center-most emitter, located at position D4, is illuminated, while the other emitters in the emitter array 20 are not illuminated. An emitter controller, described in detail below, determines how many and which of the individual emitters in the emitter array 20 are energized in the reflex sight 10 at any given time.

With reference back to FIG. 2, when energized, light from the various emitters in the emitter array 20 shines toward the lens 12, where it is reflected back to the shooter. For example, illuminating one of the emitters in the emitter array 20 causes a beam of light 32 to shine toward the lens 12, where it is reflected back to the shooter as the beam of light 42. Similarly, illuminating another of the emitters in the emitter array 20 causes a beam of light 34 to shine toward the lens 12, where it is reflected back to the shooter as the beam of light 44. Since each of the emitters in the emitter array 20 has a different position relative to the lens 12, each emitter has a unique shining angle toward and back from the lens. Thus, changing from a first of the selected emitters of the emitter array 20 to a second of the selected emitters changes the relative position of the target dot seen by the shooter without physically moving a position of any carrier plate within the reflex sight 10 itself. In fact, by properly selecting how many and which emitters are illuminated in the emitter array 20, it may be possible for the reflex sight 10 to eliminate the carrier plate in its entirety. Of course, it may also be possible to combine the emitter array 20 with a traditional carrier plate that carries the array, and allows traditional planar adjustment, so that the emitter array itself may be physically positioned relative to the reflective lens 12. In such an embodiment the user could modify the location of the target dot, or target pattern of multiple dots, by selecting which of the emitters of the emitter array 20 to illuminate, or by adjusting the carrier plate that supports the emitter array, or a combination of adjusting the carrier plate and by selecting particular emitters of the emitter array to illuminate.

Figure 5:
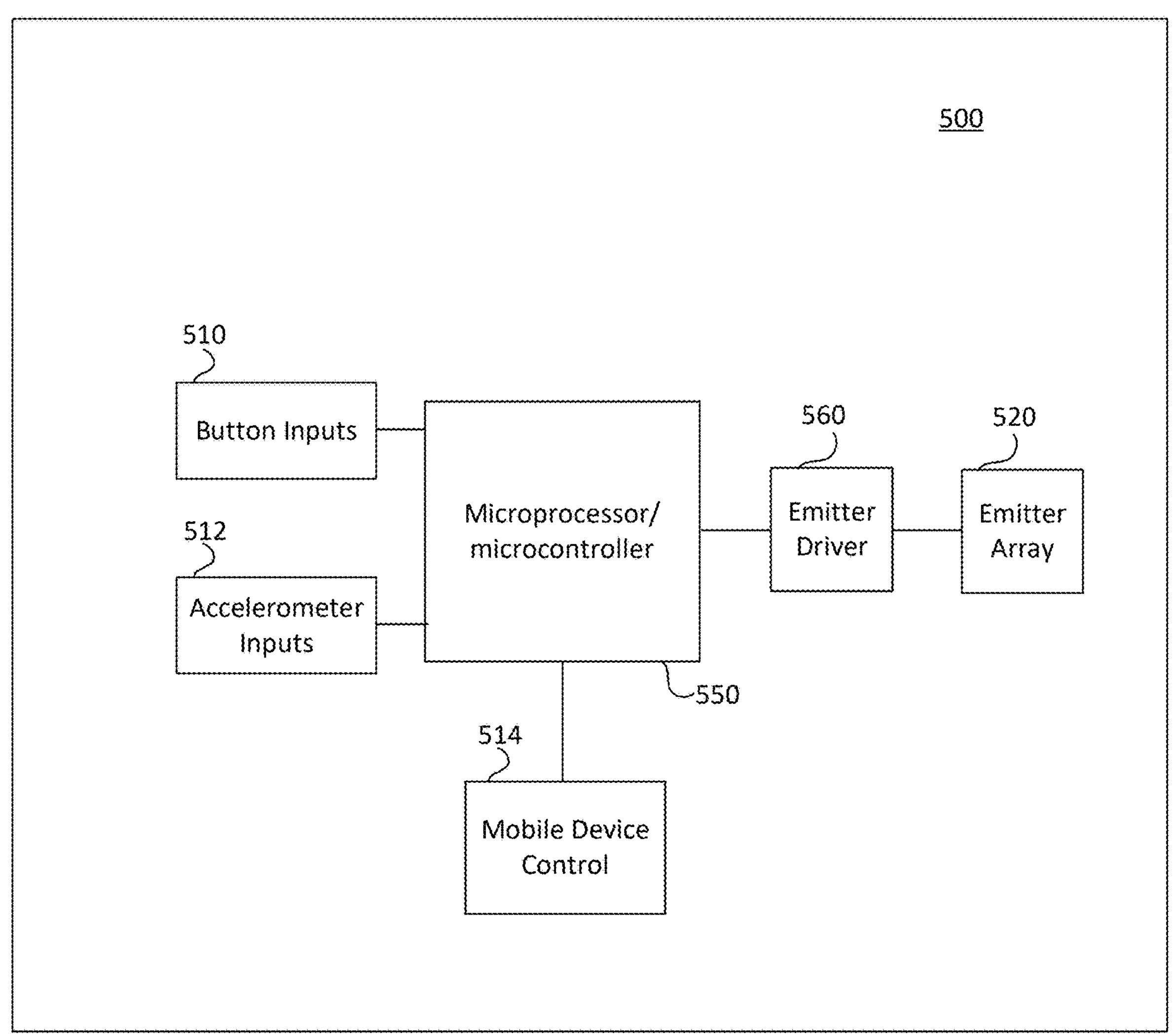
FIG. 5 is a functional block diagram of the input and output system for controlling the emitter array of FIG. 3, according to embodiments of the disclosure.

Controlling the emitter array 20 may be performed by operating a pre-programmed microprocessor or microcontroller contained in the reflex sight 10. A functional block diagram of an input and output system 500 for controlling an emitter array 520, which may be an embodiment of the emitter array 20 described above, is depicted in FIG. 5. As shown, a preprogrammed microcontroller or microprocessor 550 may accept input from a user in the form of input buttons 510, which may be embodied by the buttons 50, 60 of FIG. 2, to select which of the one or more emitters in the emitter array 520 is to be illuminated. The microprocessor 550, using these user inputs, determines which emitters to illuminate, and then sends a control signal to an emitter driver 560 to control the on/off operation of the individual emitters within the emitter array 20. In some embodiments the emitter driver 560 may be incorporated into the microprocessor 550 itself, or incorporated into other elements. Using these button inputs 510, a vertical and/or horizontal position of the illuminated emitter(s) of the emitter array 520 may be selected. Or, the position of the PoA seen by the user may be modified by the user controlling the button inputs 510 to cause the microprocessor 550 to illuminate other emitter or emitters in the emitter array 520. In another embodiment, the reflex sight 10 may include one or more accelerometer inputs 512 which detect movement of the reflex sight, so that a user tapping the sight at a particular position in a particular pattern or moving it in a particular, pre-defined, way, causes the microprocessor or microcontroller 550 to control the operation of the emitter array 520. In yet other embodiments, the microprocessor 550 may couple wired or wirelessly to a mobile device 514, such as a mobile phone that runs control software. In this embodiment the user could interact with the application running on the mobile device 514, which would then communicate with the microprocessor or microcontroller 550 to control operation of the emitter array 520.

Figure 6:
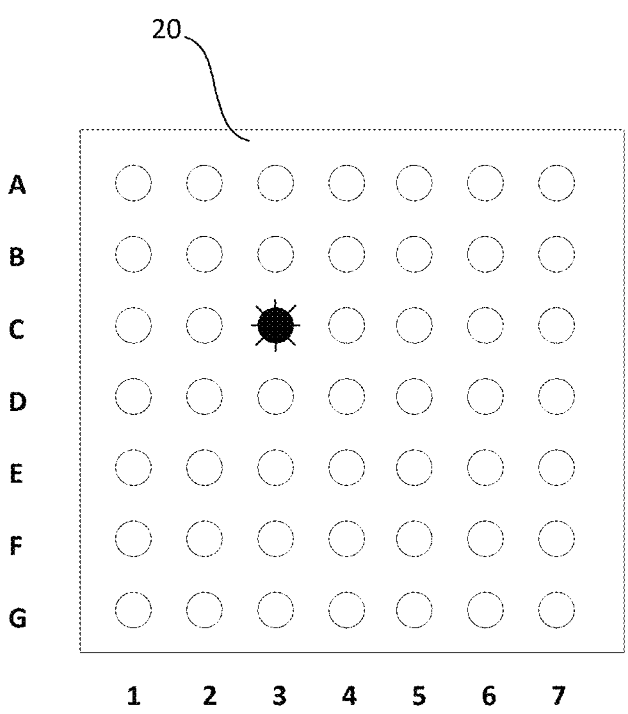
FIG. 6 illustrates another PoA created by energizing an emitter of the emitter array different than the emitter energized in FIG. 4, according to embodiments.
Figure 7:
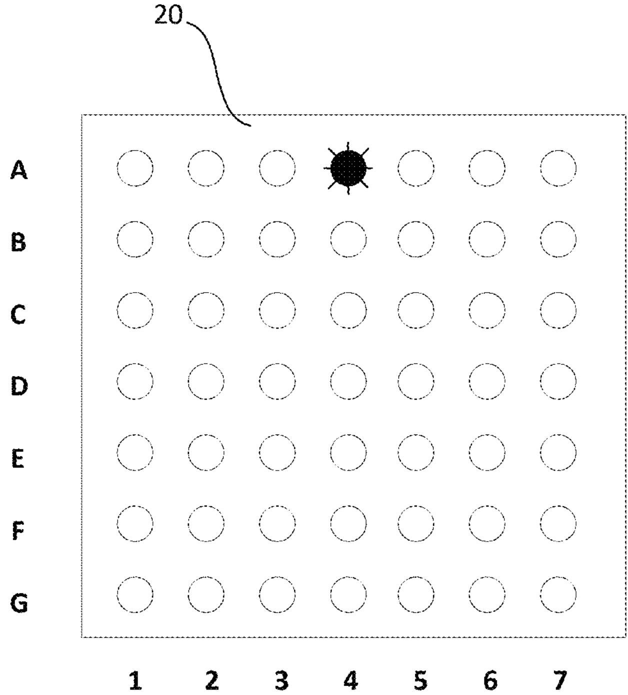
FIG. 7 illustrates yet another PoA created by energizing an emitter of the emitter array different than the emitters energized in FIGS. 4 and 6, according to embodiments.

FIGS. 4, 6 and 7 illustrate the effect of controlling the operation of the emitter array 20. FIG. 4 illustrates the center emitter, at location D4, of the emitter array 20 as being illuminated. Then, by modifying the operation of the emitter array 20, such as using the buttons 50, 60 or any of the other methods described above, the emitter array 20 may be caused to illuminate an emitter of the array different from just the center dot at D4. For example, the user may control the emitter array 20 to light the emitter at location C3, as illustrated FIG. 6, or the emitter at location A4, as illustrated in FIG. 7.

Figure 8:
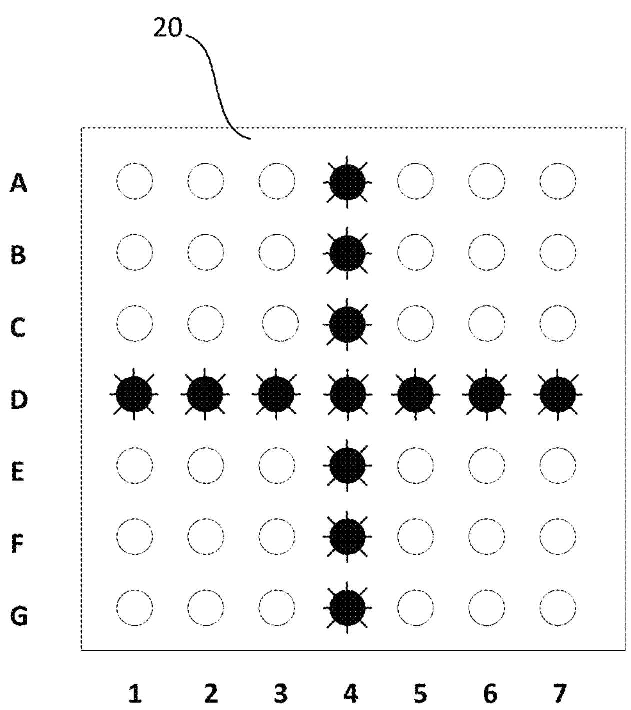
FIG. 8 illustrates a pattern of dots forming a PoA created by energizing multiple emitters of the emitter array, simultaneously, according to embodiments.
Figure 9:
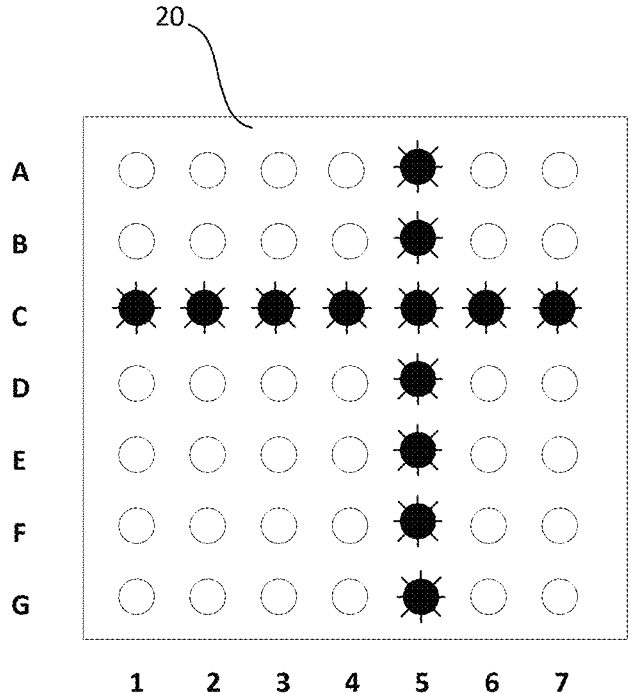
FIG. 9 illustrates another pattern of dots forming a PoA different than the patter of dots of FIG. 8, which is created by simultaneously energizing multiple emitters of the emitter array, according to embodiments.

In other embodiments several of the emitters in the emitter array 20 may be illuminated simultaneously to form reticles. For example, the emitters of the emitter array 20 may be controlled to illuminate all the emitters in row D as well as in column 4 to generate a cross-point reticle as a PoA, as illustrated in FIG. 8. Further, the user may control the "position" of the reticle as illustrated in FIG. 9 by using any of the control methods described above. For example, after the PoA of FIG. 8 is generated, the user may enter a position mode of the input and output system 500. Then, by using inputs, such as the button inputs 510, the user can instruct the microprocessor 550 to effectively 'move' the position of the PoA. In reality, since the emitter array 20 is fixed within the sight 10, moving the position of the PoA is caused by the microprocessor 550 lighting other emitters within the emitter array, to match the desired location, such as illustrated in FIG. 9. The reticle patterns may be pre-programmed into the reflex sight 10 to simplify control of the emitter array 20. Other patterns than those illustrated herein may also be possible by controlling the operation of the emitter array 20.

Figure 10:
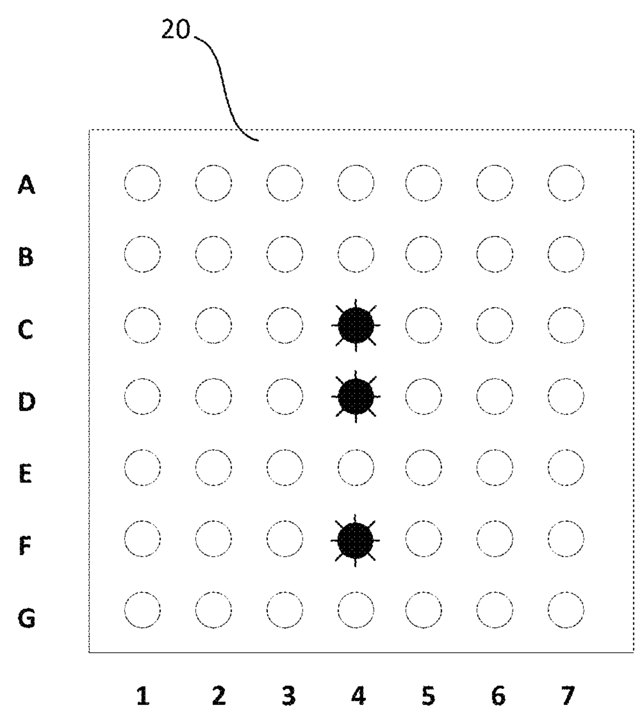
FIG. 10 illustrates a bullet drop pattern PoA created by energizing several individual, emitters of the emitter array, according to embodiments.
Figure 11:
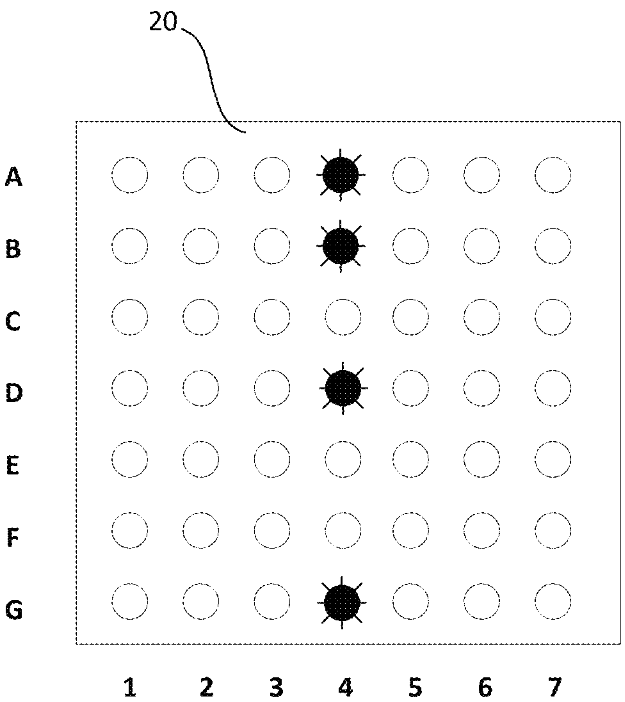
FIG. 11 illustrates another bullet drop pattern PoA created by energizing several individual, emitters of the emitter array, according to embodiments.

Further, the emitters of the emitter array 20 may be controlled to generate bullet drop reticles or bullet drop points of a PoA, as illustrated in FIGS. 10 and 11. The bullet drops in the PoA indicate aiming positions at different target distances. The bullet drops may be pre-programmed or may be received from an application running on a mobile phone that is connected to the reflex sight 10, as described above. For example, the application running on the mobile phone could be a ballistics solution program, which calculates bullet drops for various types of firearm cartridges based on one or more target distances.

Although illustrated as a square 7×7 pattern in these illustrations, the emitter array 20 need not have the same number of rows and columns. In some embodiments the pattern may be 7×5 or 5×7. In other embodiments the pattern of emitters in the array may be 10×10. The emitter array 20 may have any number of individual emitters, formed in any pattern.

Further, although it may be beneficial for each of the emitters in the emitter array 20 to be evenly spaced so that any adjustment between emitters is by a uniform amount, in other embodiments the emitter array 20 need not have evenly spaced emitters. For example, the emitters near the edges of the emitter array 20 may be closer to one another, or may be further apart from those depicted in these illustrations. Or, instead of being aligned horizontally and vertically, one or more rows or columns of the emitters may instead be positioned along a curved or partially curved line.

In yet other variations, the array need not be an array of LED emitters, but may actually be pixels of a display, such as an OLED display, or even a backlit LCD display. Other display variations are also possible. Further, the inventive concepts disclosed herein are not limited to reflex sights, but are applicable to any type of sight that generates PoAs or other types of sighting aids for the user, such as binoculars, range finders, other types of firearm sights, etc.

Although specific aspects of the disclosure have been illustrated and described for purposes of illustration, it will be understood that various modifications may be made without departing from the spirit and scope of the disclosure. Accordingly, the disclosure should not be limited except as by the appended claims.

Also, when reference is made in this application to a method having two or more defined steps or operations, the defined steps or operations can be carried out in any order or simultaneously, unless the context excludes those possibilities.

Also, directions such as "left," "right," "top," "bottom," "horizontal," and "vertical" are used for convenience and in reference to the views provided in figures. But the disclosed technology may have a number of orientations in actual use. Thus, a feature that is on top or on the bottom in the figures may not have that same orientation or direction in actual use.

Although specific examples of the invention have been illustrated and described for purposes of illustration, it will be understood that various modifications may be made without departing from the spirit and scope of the invention. Accordingly, the invention should not be limited except as by the appended claims.

We claim:

1. A target sighting system for a firearm, comprising
a reflex sight, including:
an emitter array including a plurality of light emitters, each of the plurality of light emitters capable of being independently operated to produce light,
a surface structured to reflect light from the emitter array to a user of the firearm, and
a controller configured to individually control operation of each of the plurality of light emitters in the emitter array; and
a mobile computing device wirelessly coupled with the reflex sight, the mobile computing device including a software application operating on the mobile computing device and configured to receive input from a user interacting with the computing device and, based on the input, to cause the computing device to send instructions to the controller via wireless communication to control operation of the emitter array,
wherein the controller is configured to illuminate a first subset of the plurality of light emitters of the emitter array in a predefined reticle pattern, and the software application is operable to receive user interaction with the mobile computing device that causes the mobile computing device to instruct the controller via wireless communication to illuminate a second subset of the plurality of light emitters in the predefined reticle pattern, wherein the second subset is different from the first subset.

2. The target sighting system according to claim 1 in which the plurality of light emitters are Light Emitting Diodes.

3. The target sighting system according to claim 1 in which the plurality of light emitters are Organic Light Emitting Diodes.

4. The target sighting system according to claim 1 in which the controller is configured to receive an indication to move a relative position of a point of aim generated by the reflected light from the emitter array, and, in response, turns off the first subset of the plurality of emitters and turns on the second subset of the plurality of emitters in the emitter array.

5. The target sighting system according to claim 1 in which the first subset of the plurality of light emitters is arranged in a line in the emitter array so that the predefined reticle pattern is a line.

6. The target sighting system according to claim 1 in which the surface structured to reflect light from the emitter array is a collimating surface.

7. The target sighting system according to claim 1 in which a spacing between the plurality of light emitters in the emitter array is non-uniform.

8. The target sighting system according to claim 1 in which the emitter array is disposed on an adjustable carrier plate.

9. A reflex sight system for a firearm, comprising:
a reflex sight including
an emitter array including a plurality of light emitters, each of the plurality of light emitters capable of being independently operated to produce light,
a surface structured to reflect light from the emitter array to a user of the firearm; and
a computing device in communication with the emitter array, the computing device configured to:
(i) operate a ballistics solution program configured to determine, for a firearm cartridge selected by a user from amongst multiple different types of cartridges, two or more aiming positions for the selected firearm cartridge, and
(ii) control operation of the plurality of light emitters to simultaneously indicate the two or more aiming positions.

10. The reflex sight system according to claim 9 in which the plurality of light emitters are Light Emitting Diodes.

11. The reflex sight system according to claim 9 in which the plurality of light emitters are Organic Light Emitting Diodes.

12. The reflex sight system according to claim 9 in which the controller is configured to illuminate a first subset of the plurality of light emitters of the emitter array in a predefined reticle pattern and the computing device is configured to receive an indication to move a relative position of a point of aim generated by the reflected light from the emitter array, and, in response, to turn off the first subset of the plurality of light emitters turn on a second subset of the plurality of light emitters in the emitter array, wherein the second subset is different from the first subset.

13. The reflex sight system according to claim 9 in which the computing device is structured to drive some but not all of the plurality of light emitters in the emitter array.

14. The reflex sight system according to claim 13 in which the controller is configured to drive some but not all of the plurality of light emitters in the emitter array in a predefined reticle pattern.

15. The reflex sight system according to claim 14 in which the predefined reticle pattern is a line formed by driving multiple of the plurality of light emitters, the multiple of the plurality of light emitters arranged in a line in the emitter array.

16. The reflex sight system according to claim 9 in which the surface structured to reflect light from the emitter array is a collimating surface.

17. The reflex sight system according to claim 9 in which a spacing between the plurality of light emitters in the emitter array is non-uniform.

18. The reflex sight system according to claim 9, further comprising the ballistics solution program operating on the computing device and in which the computing device is further configured to control operation of the plurality of light emitters to define a bullet drop reticle pattern simultaneously indicating the two or more aiming positions, and wherein each of the two or more aiming positions corresponds to bullet drop for the selected firearm cartridge at a different target distance.

19. The reflex sight system according to claim 14 in which the predefined reticle pattern is pre-programmed into the reflex sight and the computing device is configured to allow the user to select the predefined reticle pattern, via interaction with the computing device, from amongst several different reticle patterns that are pre-programmed in the reflex sight.

20. The target sighting system according to claim 1 in which the predefined reticle pattern is pre-programmed into the reflex sight.

21. The target sighting system according to claim 1 in which the software application is configured to allow the user to select the predefined reticle pattern, via interaction with the mobile computing device, from amongst several different reticle patterns that are pre-programmed in the reflex sight.

* * * * *